Patented May 6, 1952

2,595,238

UNITED STATES PATENT OFFICE 2,595,238

METHOD OF PRODUCING POTASSIUM CHLORATE CRYSTALS OF SPECIAL APPEARANCE

Jean Leon Maurice Frejacques, Paris, France, assignor to Pechiney-Compagnie de Produits Chimiques et Electrometallurgiques No Drawing. Application May 16, 1947, Serial No. 748,654. In France September 6, 1946

4 Claims. (Cl. 23—85)

It is known that potassium chlorate crystallizes in the form of tabular crystals of variable thickness and that the addition of certain coloring materials to the hot aqueous solution before crystallization modifies the appearance of the crystals that are obtained by changing to a considerable degree the relative importance of the crystalline faces (see for instance the experiments made by Bukley at Manchester University, as described in "Zeitschrift für Kristallographie," 1932 to 1939).

The chlorate thus obtained is in the form of crystals of variable fineness, having the aspect either of fine needles or of thin plates with sharp or irregular edges, or again of spherical crystals of irregular formation. These crystals always retain by adsorption a certain amount of coloring material and are therefore always strongly colored, which, in many applications, is a rather serious disadvantage.

The object of the present invention is to provide potassium chlorate crystals of a structure modified as above set forth, but which are colourless or but slightly coloured. These crystals may be used in pyrotechnical compositions such as those described in my copending application Serial Number 748,655.

With this object in view, according to a feature of my invention, potassium chlorate is treated by means of sulphonated organic products soluble in water and which lower the surface tension thereof, such as those used as wetting or emulsifying agents in industry.

These products are generally colourless or at least very slightly coloured so that it is possible to obtain potassium chlorate crystals which are either colourless or but slightly coloured.

Examples of such sulphonated organic products are the following: the sulphonated derivatives of naphthalene or alkyl-naphthalenes, such for instance as dibutyl- or diheptyl-naphthalene sulphonates; sulphonated fatty alcohols, such as sulphonated lauric alcohols; sulphonated phenyl oxide; sulphonated paraffinic hydrocarbons.

Of course, it is understood that the above products are cited by way of example and that these indications have no limitative character.

The products in question are generally utilized in the form of free acids or of sodium or potassium salts, but other compounds may also be utilized according to my invention, provided that they are soluble in water. It generally suffices to add some 1 to 10 thousandths by weight of these products to the hot chlorate solutions to be crystallized to obtain considerable modifications of the crystalline appearance thereof. The crystals that are obtained are then either in the form of very fine long needles, more or less entangled together, or in the form of extremely thin plates more or less stacked upon one another.

Example 1

The product that is utilized is obtained by the treatment of paraffins. For this purpose, crystallized paraffin having a melting point ranging from 30 to 35° C. is subjected to the action of a stream of chlorine and $SO_2$ in the presence of light, according to known methods. This operation is stopped when the increase of weight of paraffin is about 100 per cent. The product thus obtained is treated with soda lye and purified by an extraction by means of methyl alcohol, which dissolves the sulphonate and leaves the sodium chloride that has been formed and the small amount of paraffin that has not been transformed. The product finally obtained, after evaporation of the methyl alcohol used, is added to an aqueous solution of potassium chlorate, saturated at 80° C. and slightly overheated in order to avoid the premature formation of crystals, at the rate of 0.5 kg. of product per cubic meter of solution. The solution is then allowed to cool down, either with or without stirring, according to the size of the crystals to be obtained. These crystals are in the form of entangled needles, long and very fine, which are subsequently dried.

The mother water that remains after this operation still contains about 40 per cent of the initial amount of sulphonated paraffin introduced into the solution. This mother water is again saturated with potassium chlorate, the necessary amount of sulphonated product is added thereto, and the solution is again utilized for a further operation.

Example 2

The product used is the paraffin treated as in Example 1, but only up to an increase of weight of 70%, followed by a treatment with sodium lye and a purification by extraction with methyl alcohol, which dissolves the sulphonate and leaves the sodium chloride formed and the small quantity of paraffin which has not been transformed.

The product obtained after evaporation of the methyl alcohol is added to the amount of 2 kg. into a solution containing 1000 kg. of water and 200 kg. of potassium chlorate heated to 75° C. Upon slow cooling of this solution, crystals of potassium chlorate are obtained in very thin sheets, very colourless and scintillating.

Example 3

The product used is the paraffin treated as in Example 1 up to an increase of weight of 100%, followed by a dissolution in benzene and a treatment at 20° C. with gaseous ammonia for 12 hours. A viscous paste separates and collects at the bottom of the container. This product is a paraffin sulphamide mixed with $NH_4Cl$. The latter is eliminated by washing with water. The paraffin sulphamide thus obtained is added in the amount of 2 kg. to a solution containing 1000 kg. of water and 200 kg. of potassium chloride heated to 75° C. Upon slow cooling of this solution, crystals of potassium chlorate are obtained as very fine interlaced needles.

Example 4

A hot aqueous solution containing 250 grams of potassium chlorate and 2.5 grams of heptyl-naphthalene-sulphonate of sodium per litre is crystallized by slow cooling. The potassium chlorate crystallizes in short, very fine needles having the appearance of glass wool.

Example 5

A hot aqueous solution containing 250 grams of potassium chlorate and 2.5 grams of butyl-naphthalene-sulphonate of sodium per litre is crystallized by slow cooling. Flat crystals of potassium chlorate are obtained among which are some large needles arranged in parallel relation.

Example 6

A hot aqueous solution containing 250 grams of potassium chlorate and 2.5 grams of sulphonated lauric alcohol per litre is crystallized by slow cooling. There are obtained very fine, colourless needles of potassium chlorate, having the size of 1.5 microns at the maximum, conglomerated in packages of 30 to 50 microns.

In a general manner, while I have, in the above description, disclosed what I deem to be practical and efficient embodiments of my invention, it should be well understood that I do not wish to be limited thereto as there might be changes made therein without departing from the principle of my invention as comprehended within the scope of the accompanying claims.

What I claim is:

1. A method of producing potassium chlorate crystals having substantially no color, consisting of: introducing potassium chlorate to warm water, adding to the aqueous solution of the salt an amount in the order of 0.1 to 1.0% of a sulphonated paraffin hydrocarbon, subsequently cooling the aqueous solution to bring about the desired crystallization, and separating the potassium chlorate crystals from the aqueous solution.

2. A method of producing potassium chlorate crystals having substantially no color, consisting of: introducing potassium chlorate to warm water, adding to the aqueous solution of the salt an amount in the order of 0.1 to 1.0% of a compound selected from the group consisting of amides of sulphonated paraffin hydrocarbons, and the sodium and potassium salts of sulphonated paraffin hydrocarbons, subsequently cooling the aqueous solution to bring about the desired crystallization, and separating the potassium chlorate crystals from the aqueous solution.

3. A method of producing potassium chlorate crystals having substantially no color, consisting of: introducing potassium chlorate to warm water, adding to the aqueous solution of the salt an amount in the order of 0.1 to 1% of an amide of a sulphonated paraffin hydrocarbon, subsequently cooling the aqueous solution to bring about the desired crystallization, and separating the potassium chlorate crystals from the aqueous solution.

4. A method of producing potassium chlorate crystals having substantially no color, consisting of: introducing potassium chlorate to warm water, adding to the aqueous solution of the salt an amount in the order of 0.1 to 1.0% of a salt selected from the class consisting of sodium and potassium salts of sulphonated paraffin hydrocarbons, subsequently cooling the aqueous solution to obtain the desired crystallization, and separating the potassium chlorate crystals from the aqueous solution.

JEAN LEON MAURICE FREJACQUES.

REFERENCES CITED

The following references are of record in the file of this patent:

UNITED STATES PATENTS

| Number | Name | Date |
|---|---|---|
| 1,766,705 | Rossen | June 24, 1930 |
| 1,792,863 | Peet | Feb. 17, 1931 |
| 2,021,093 | Kressler | Nov. 12, 1935 |
| 2,044,942 | Hechert | June 23, 1936 |
| 2,046,090 | Reed | June 30, 1936 |
| 2,099,079 | Rumscheidt | Nov. 16, 1937 |
| 2,304,767 | Ross | Dec. 8, 1942 |
| 2,333,788 | Holbrook | Nov. 9, 1943 |

OTHER REFERENCES

Mellor's Treatise on Inorganic and Theoretical Chem., vol. 2, page 326. Longmans, Green & Co., N. Y.